United States Patent [19]

Fryd et al.

[11] Patent Number: 5,708,102

[45] Date of Patent: Jan. 13, 1998

[54] LIVING RADICAL POLYMERIZATION OF VINYL MONOMERS

[75] Inventors: Michael Fryd, Moorestown, N.J.; Bradford B. Wayland; George Poszmik, both of Philadelphia, Pa.; Shakti L. Mukerjee, Upper Darby, Pa.

[73] Assignee: E. I. Du Pont de Nemours and Company, Wilmington, Del.

[21] Appl. No.: 704,644

[22] PCT Filed: Mar. 3, 1995

[86] PCT No.: PCT/US95/02514

§ 371 Date: Sep. 12, 1996

§ 102(e) Date: Sep. 12, 1996

[87] PCT Pub. No.: WO95/25765

PCT Pub. Date: Sep. 28, 1995

[51] Int. Cl.[6] .................. C08F 4/44; C08F 4/06; C08F 4/10; C08F 4/50

[52] U.S. Cl. .............. 526/172; 526/171; 526/217; 526/218.1; 526/303.1; 526/317.1; 526/319; 526/341; 526/342; 526/347

[58] Field of Search .................. 526/171, 172, 526/217, 218.1, 219

[56] References Cited

U.S. PATENT DOCUMENTS

| | | | |
|---|---|---|---|
| 4,581,429 | 4/1986 | Solomon et al. | 526/220 |
| 4,680,354 | 7/1987 | Lin et al. | 526/172 |
| 4,694,054 | 9/1987 | Janowicz | 526/93 |
| 5,312,871 | 5/1994 | Mardare et al. | 525/272 |
| 5,328,970 | 7/1994 | Inoue | 526/161 |

FOREIGN PATENT DOCUMENTS

| | | |
|---|---|---|
| 0416304A2 | 8/1990 | European Pat. Off. |
| 0510602A1 | 4/1992 | European Pat. Off. |
| WO87/03605 | 6/1987 | WIPO |
| WO 94/01471 | 1/1994 | WIPO |

OTHER PUBLICATIONS

Otsu et al, Radical Polymerization of methyl methacrylates with some 1,2–disubstituted teterphenylethanes as thermal iniferters, *Polymer Bulletin*, vol. 17, pp. 323–330, 1987.

Quirk et al., Experimental Criteria for Living Polymerizations, *Polymer International*, vol. 27, pp. 359–367, 1991.

Otsu et al., Living Radical Polymerization in Homogenous System by Using Iniferter: Design of Block Copolymers, *J. Macromol. Sci.-Chem.*, A21(8&9), pp. 961–977, 1984.

Webster et al., Group–Transfer Polymerization. 1. A New Concept for Additional Polymerization with Organosilicon Initiators, *American Chemical Society*, vol. 105, pp. 5706–5708, 1983.

Kanda et al., Formation of Long–Lived Intramolecular Radical Ion Pair From the Singlet Excited State of Porphyrin–Methylviologen Combined with Flexible Chains, *Chemical Physics Letters*, vol. 129, No. 3, pp. 306–309, 1986.

J. D. Druliner, Living Radical Polymerization Involving Oxygen–Centered Species Attached to Propagating Chain Ends, *Macromolecules*, vol. 24, pp. 6079–6082, 1991.

Pierre Sigwalt, Living Polymers in Ionic and Radical Polymerizations: Recent Developments, *J. Macromol. Sci.-Chem.*, vol. A28(9), pp. 949–957, 1991.

Tazaki et al., Radical polymerization of methyl methacrylate with methyl 2,2–dimethyl–3,3–diphenyl–3–cyanopropionate as a thermal iniferter, *Polymer Bulletin*, vol. 17, pp. 127–134, 1987.

*Primary Examiner*—Fred Zitomer
*Attorney, Agent, or Firm*—James A. Costello

[57] ABSTRACT

This invention relates generally to a living free radical polymerization of alkene monomers through use of persistent metal centered radicals to attain control of the propagation and termination steps in radical polymerization. This process is useful for controlling the molecular weight of homopolymers or copolymers and for forming block copolymers.

20 Claims, No Drawings

LIVING RADICAL POLYMERIZATION OF VINYL MONOMERS

BACKGROUND OF THE INVENTION

1. Field of the Invention

This invention relates to living free radical polymerization of vinyl monomers using metal complexes as reversible radical capping agents.

2. Description of the Prior Art

The term living polymerization pertains to a polymerization process where the growing polymer chains contain one or more active sites that are capable of promoting further polymerization. One general strategy for obtaining living polymerization is to have a chemical species reversibly cap the active center that promotes polymerization. In ionic polymerizations initiated by anions (anionic polymerization) or cations (cationic polymerization) the counter cation or anion respectively function as a capping agent. When the ions are bound together polymerization stops, but reversible dissociation into ionic fragments provides a controlled source of sites that promote further ionic polymerization. Living ionic polymerizations are widely utilized in forming block copolymers by sequential addition of different alkene monomers.

In contrast to living ionic polymerizations, previous efforts to attain living free radical polymerizations have utilized polymerization initiators (R—X) that can fragment into an alkyl radical (R.) that promotes polymerization of alkene monomers and a second radical (X.=Ar$_3$C., R$_2$NO., (CH$_3$)$_2$NCS$_2$.) where the unpaired electron resides on a main group atomic center (C, O, S) which functions to cap the growing polymer radical (RM$_n$X).

Regarding previous attempts at living polymerization, see Webster, O. W. *Science* 251, 887 (1991); Otzu, T., Matsunaga, T., Kuriyama, A., Yoshaka, M. *Eur. Polym. J.* 25, 643 (1989); Bledzki, A., Braun, D., Titzschkaw, K. *Makromol. Chem.* 184, 745 (1983); and Solomon, D. H., Rizzardo, E., Cacioli, P. U.S. Pat. No. 4,581,429 (1986).

These prior art approaches have had only limited success in producing block and end-functionalized polymers. The inability to maintain narrow dispersities at relatively high molecular weights, and to produce pure block copolymers illustrates the deficiencies of this prior technology. In no instance has a main group capping agent been demonstrated to attain or even approach the ideal characteristics for an authentic living radical polymerization.

SUMMARY OF THE INVENTION

This invention broadly concerns a process for the quasi-living free-radical polymerization of an ethylenically unsaturated monomer comprising the steps:

(i) forming a transition metal initiator or initiator precursor having the formula:

L—M—(R)n wherein

L is a ligand having a molecular size sufficient to sterically inhibit hydrogen atom abstraction from the growing polymer radical by L—M;

M is a transition metal selected from at least one of elements 23 through 28, 40 through 46, and 72 through 78 of the periodic table;

L—M inhibits termination by reversibly capping the growing polymer chain and is incpable of initiating polymerization;

R is an organic moiety that initiates polymerization; and n is 0 or 1;

(ii) contacting the ethylenically unsaturated monomer with initiator, L—M—R, or with L—M plus a source of R. from a free-radical initiator external to L—M; and (iii) polymerizing the monomer by a free-radical mechanism, whereby a narrow polydispersity is maintained and the number average molecular weight of the polymer grows substantially linearly as monomer is converted to polymer.

Preferred processes of this invention include the following embodiments of the broad process described above:

the process which comprises contacting the monomer with transition metal initiator L—M—R, the process which comprises contacting the monomer with L—M and an external source of R., the process wherein M is selected from the group Cr, Mn, Fe, Co, Ni and Cu, the process immediately above wherein M is Co (more preferred), the process wherein L is selected from the group porphyrins, phthalocyanines, tetraaza[14]-annulenes, tetraazaporphyrins, vicinal iminohydroxyimino compounds and their bridged derivatives, diazadihydroxyiminodialkyldecadienes and -undecadienes and their bridged derivatives, tetraazatetraalkylcyclotetradecatetraenes and -dodecatetraenes, N,N,-bis(salicylidene)ethylenediamines and dialkyldiazadioxo-dialkyldodecadienes and -tridecadienes, the process wherein R is an organic moiety bound to the transition metal by a carbon-to-carbon bond, the process wherein R is selected from the group alkyl, aryl, heterocyclic species or a substituted derivative of one of these species which is capable of homolytic dissociation from the metal ion on heating or on irradiation with visible or ultraviolet light, the process immediately above wherein R is alkyl, the process wherein L—M—R is (tetramesitylporphyrinato)cobalt-neopentyl, the process wherein L—M—R is (tetramesitylporphyrinato)cobalt-CH(CO$_2$CH$_3$)CH$_2$CH$_3$, the process wherein L—M is (tetramesitylporphyrinato) cobalt(II) and R. is derived from an azo initiator, the process immediately above wherein the azo initiator is 2,2'-azobis(4-methoxy-2,4-dimethylvaleronitrile) (more preferred), the process wherein the monomer comprises 1-substituted ethene, the process immediately above wherein the polymer is selected from the group consisting of acrylic acid, its esters and amides, substituted or unsubstituted styrene, acrylonitrile or mixtures thereof (more preferred), the process wherein the polymer is homopolymer, the process wherein the polymer is a random copolymer, the process immediately above wherein the copolymer comprises random components of at least one of the following units acrylic acid, its esters and amides, substituted or unsubstituted styrene, acrylonitrile or mixtures thereof (more preferred), the process comprising sequentially adding diverse monomers to form a block copolymer, the process wherein the polydispersity of the polymer does not exceed about 2, the process immediately above wherein the polydispersity of the polymer does not exceed 1.5 (more preferred).

DETAILS OF THE INVENTION

The process of this invention achieves the following criteria which characterize living polymerization. Normally, such polymerization is obtainable only by ionic processes and not by a free-radical mechanism such as described herein:

(1) polymerization proceeds until all of the monomer has been consumed and further addition of monomer results in continued polymerization;

(2) the number average molecular weight $\overline{M}_n$ (or $\overline{X}_n$ the number average degree of polymerzation) is a linear function of conversion;

(3) the number of polymer molecules (and active centers) is a constant which is thus independent of conversion;

(4) the molecular weight can be controlled by the stoichiometry of the reaction;

(5) narrow molecular weight distribution polymers are produced; and (6) block copolymers can be prepared by sequential monomer addition.

The term "ligand" as used herein is defined as any atom, radical or molecule that can bind to the metal center of a complex. The equatorial ligand or ligands are of particular concern, although an axial ligand or ligands may also be present. Such metal chelate complexes provide a class of compounds that can reversibly bind with a carbon centered radical (R.)

The metal complexes (ML) which function to bind reversibly the growing polymer radical preferably contain first transition series metals (Cr, Mn, Fe, Co, Ni, Cu) which form relatively weak M-carbon bonds. In the following formulas and reactions, cobalt is a preferred example for a metal. Any ligand or set of ligands (L) that allows for ML to bind with the growing polymer radical and inhibits termination reactions is suitable.

Controlled radical polymerization of vinyl monomers (CH$_2$=CH(X)) can be achieved either by the use of, for example, an organocobalt complex (LCoR) as a catalyst which provides both an initiator radical (R.) and capping agent (LCo.) or alternately by a catalyst system consisting of a cobalt(II) complex and alkyl radicals generated from conventional radical sources such as dialkyl azo compounds like AIBN. Propagation of the living radical vinyl polymer chain for both types of catalyst systems occur through the same type of polymer-cobalt organometallic complex (R(CH$_2$CHX)$_n$—Co) by repetitive reversible cobalt-carbon bond homolysis, insertion of one or more monomer units and capping of the new polymer radical by LCo$^{II}$, as a capping agent. This produces a living polymerization process.

Thermal or photolytic homolysis of an LM—R bond produces an organic radical (R.), which propagates alkene radical polymerization, and a metal complex (ML) which subsequently recaps the growing polymer radical chain. Repetition of these events without organic radical termination produces living radical polymerization where each polymer chain contains an active site where polymer growth can continue. This can be represented as follows:

 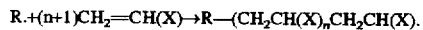

The presence of the reversible capping agent protects against organic radical termination reactions such as the following:

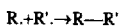

wherein R' is a growing polymer chain. The capping agents described herein protect against reactions that produce polymer chains that are incapable of further growth. Examples of such capping agents are provided where the choice of the ligands (L) in LM complexes also inhibit reactions between LM and the growing polymer radical which give organic radical termination as follows:

Metal complexes of sterically demanding ligands such as tetramesitylporphyrin ((TMP)M) have been found to repress organic radical termination processes and produce nearly ideal living radical polymerization of acrylates.

Sequential addition of different monomers produces block copolymers which contain an active center that can subsequently be used in forming multiple block copolymers. This is illustrated by the following reactions:

Formation of a first block:

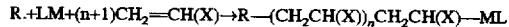

Formation of a second block:

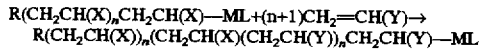

Formation of a third block:

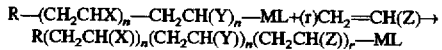

This new approach of using metal complexes as reversible capping agents in the radical polymerization of alkenes provides a substantially improved process to attain living radical polymerization compared with the existing technologies.

As a departure from the prior art, the present invention is based on metal complexes that are utilized in reversibly interacting and binding with the growing polymer radical site. The advantages for using metal complexes as capping agents are that the steric and electronic effects of the ligands and the choice of metal center provide a versatile methodology for both adjusting the metal-initiator or metal-carbon bond dissociation energy and restricting access to reaction pathways that produce termination of radical chains. Control of the metal-initiator bond dissociation energy provides the ability to adjust the rate and extent of forming the active radical centers. Steric demands of the ligands and the electronic properties of the metal can be used in repressing side reactions that terminate radical polymerization.

Living radical polymerization of vinyl monomers can be obtained by addition of metal complexes which reversibly bond with the growing polymer radical. For example, metal complexes (ML) capable of reacting with an organic radical (R.) to form an organometal complex (LM—R) are potential candidates for controlling radical polymerization of alkenes. This is illustrated as follows:

Reversible dissociation of the organometal complex becomes the controlled source of radicals that grow by addition of monomers until formation of an organometal complex. Repetition of these events results in living radical polymerization of the alkene monomer.

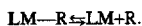

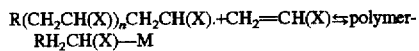

Addition of a different monomer to the metal-complex capped vinyl polymer (polymer-CH$_2$CHX—M) results in reinitiation of polymerization to form a block copolymer (AB). Sequential addition of a series of monomers (X, Y . . . ) can in principal produce multiple block copolymers (AB, ABA, ABC, etc.) as follows:

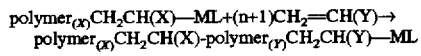

In an ideal living radical polymerization, each polymer chain has one or more active sites where further polymer chain growth occurs. Processes that terminate radicals result in chains that can no longer participate in polymerization. Irreversible radical coupling (R.+R'.→R—R') and hydrogen abstraction from the carbon adjacent to the radical site (RCH$_2$CH(X).+R'.→R'—H+RCH=CH(X)) terminate radicals and must be suppressed in order to obtain authentic living radical polymerization. Variation of steric and electronic factors of metal complexes can be effective in suppressing radical termination processes. Organic radical coupling (R.+R'.→R—R') which would terminate radical polymerization can be virtually eliminated by competition with the cross coupling of the metal complex and radical (ML+R.⇌LM—R). By using a metal complex that does not couple with itself (2ML↛LM—ML), the ratio of the metal complex (ML) to the radical (R.) can be established such that the reversible cross coupling (LM+R.⇌LM—R) effectively eliminates the irreversible organic radical coupling (R.+R'.→R—R) and disproportionation (R.+R'CH$_2$CH(X) .→R—H+R'CH=CH(X)). Hydrogen abstraction from the growing radical chain is an activated process and subject to steric restrictions for the hydrogen abstracting species (ML or R'.) to reach the β-H position. Lowering the reaction temperature invariably reduces β-H abstraction. The steric demands of metal complexes are readily varied by using substituents on the ligands to control the steric requirements of the complex. By constructing metal complexes with ligands that inhibit access of the metal center to a β-H of the radical, hydrogen abstraction by the metal complex can be suppressed and effectively eliminated as follows:

The present invention, therefore, is generally directed to the use of metal complexes as reversible radical capping agents to achieve living radical polymerization. As indicated above, a preferred class includes cobalt complexes. Strong field complexes of cobalt(II) have a single unpaired electron (LCo.) and can function as radical capping agents by reactions with carbon centered radicals (R.) to form organocobalt complexes (LCo—R). Relatively weak cobalt-carbon bonds provide a reversible source of carbon and metal centered radicals as follows:

The alkyl radical (R.) initiates and promotes the propogation of alkene polymerization and the cobalt metalloradical (LCo.) reversibly caps the growing polymer radical chain which produces controlled radical polymerization of alkenes. Cobalt metallo-radicals are incapable of initiating radical polymerization of alkenes and thus fulfill the minimum requirements for a capping agent for application in living radical polymerization.

Cobalt porphyrins and related macrocycle and chelate complexes are examples of reversible radical capping agents. They produce varying degrees of living character in the radical polymerization of acrylates and related vinyl alkene monomers, depending on the structure of the cobalt complex and reaction conditions. In order to obtain living radical character in an alkene polymerization, the processes that remove radicals and terminate polymerization must be repressed. Termination of radical chain growth often occurs by hydrogen atom abstraction from the carbon adjacent to the radical center (β-H abstraction) and inter-polymer radical chain coupling. Both increased steric demands of the cobalt porphyrin or related cobalt complexes and lowered reaction temperature are observed to decrease hydrogen abstraction from the position β to the radical center in the growing polymer radical. The presence of cobalt(II) porphyrin or related Co(II) complexes suppress termination by inter-polymer radical coupling through cross coupling of the cobalt metallo-radical center (LCo.) and the polymer radical (R'.) to form a polymer-cobalt organo-metallic complex (LCo—R). Reversible homolysis of the LCo—C bond in the polymer-cobalt organometallic complex (LCo—R'⇌LCo.+R'.) provides a continuous controlled source of polymer organic radicals which continue to promote alkene polymerization as follows:

Controlled radical polymerization of vinyl monomers (CH$_2$=CH(X)) is obtained by the use of organocobalt catalysts (LCo—R) that provide both the initiator radical (R.) and capping agent (LCo.) and also by initiation using an alkyl radical source such as AIBN in the presence of a cobalt(II) complex as the capping agent. Propagation of the living radical chain in both cases occurs through a polymercobalt organometallic complex (LCo—R) by repetitive reversible cobalt-carbon bond homolysis and monomer insertion. Increasing the steric demands for the cobalt complex or the polymer radical chain decreases the LCo—C bond homolysis enthalpy which increases the concentration of polymer radicals and thus increases the rate of polymerization. Increased ligand steric requirements inhibits access of the cobalt to the β-H position and suppresses or prohibits the β-H abstraction process that terminates radicals and produces non-living polymer units.

Linear increase in $\overline{M}_n$ with conversion, low polydispersity (1.1–1.3), and formation of block copolymers associated with near ideal living polymerization are observed for the radical polymerization of acrylates when sterically demanding cobalt complexes are used as reversible radical capping agents, for example tetra (2,4,6-trimethylphenyl) porphyrin or (TMP)Co and tetra (2,4,6-triethylphenyl) porphyrin or (TYEPP)Co as merely two examples. Suitably, substituents on the ligand L preferably have a steric bulk equal to or greater than phenyl.

According to the invention, transition metal complexes in accordance with the following general formulae may be employed as an initiator and/or capping agent:

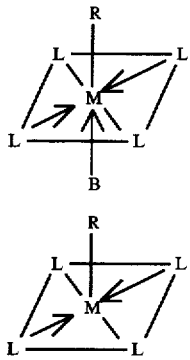

(Ia)

(Ib)

In the transition metal complex BLM—R of Formula Ia, M is a transition metal, L is the ligand or set of ligands which occupy four equatorial coordination sites, and R is a species which is capable of homolytic dissociation from the metal ion on heating or on irradiation with visible or ultraviolet light. Examples of such species can be hydrogen, an organic group, or a halogen atom. B is a ligand that occupies an axial position trans to R in Formula Ia. Complexes that function both as the initiator and capping agent are either five or six coordinate and have the general formulas LM—R or (B)LM—R (Formula Ib and Ia above). Complexes that function as the capping agent are either four or five coordinate species or a source for four or five coordinate complexes that have the general formulas (B)LM or LM according to Formula Ic and Id below:

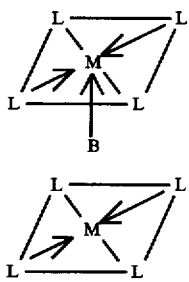

(Ic)

(Id)

The equatorial coordination may be obtained from a single tetradentate chelating ligand, from two bidentate ligands, or from one bidentate ligand plus two monodentate ligands, or any other appropriate combination of ligands.

The group R in Ia and Ib is a covalently-bound axial organic which group may comprise any alkyl, aryl, or heterocyclic species, or substituted derivatives of these.

The axial ligand (B) can be, for example, water, an alcohol or other hydroxylic species, a thioether, amine, phosphine, carbonyl or carboxylate, or any other species which does not inhibit dissociation of the opposing axial ligand. Particularly useful ligands include weakly basic amines such as pyridine or substituted pyridines. The ligand (B) may also be derived in situ from the monomer or other species present in the polymerization mixture. Useful agents may also include species which lack the axial ligand (B).

Representative equatorial ligands (L): porphyrins (II), phthalocyanines (III), tetraaza[14]-annulenes (IV), tetraazaprophyrins (V), vicinal iminohydroxyimino compounds (VI) and their BR$_2$ bridged derivatives (VII), diazadihydroxyiminotetraalkyldecadienes and -undecadienes (VIII) and their BR$_2$ bridged derivatives (IX), tetraazatetraalkylcyclotetradecatetraenes and -dodecatetraenes (X), BR$_2$ bridged cyclic derivatives of vicinal dihydroxyimino compounds (XI), N,N,-bis(salicylidene)ethylenediamines (XII) and dialkyldiazadioxodialkyldodecadienes and -tridecadienes (XIII). In formulas II to XIII each R, independently, is either —H, —F, —Cl, —Br, —I, —CN, straight or branched alkyl, aryl or aralkyl group; or R and R on adjacent carbon atoms taken together is $C_5$ to $C_8$ cycloalkylene; each $R^2$, independently, is —H, straight or branched alkyl, aryl or aralkyl; $R^3$ is —F, —Cl, straight or branched alkyl, aryl or aralkyl; $R^4$ is —OH or —NH$_2$; and n is 2 or 3. The alkyl, aryl and aralkyl groups can be unsubstituted or substituted partially or fully with substituents that are compatible with the use of these complexes as radical capping agents. Examples of such substituents include —OR$^5$, —NR$^5{}_2$, —F, Cl, —Br, —I, —NO$_2$, —SO$_3$R$^5$ and —R$^5$ where R$^5$ is H or straight or branched alkyl. The corresponding structures for the metal complexes of these ligands are given below. More specifically, the corresponding metal complex of structure II is XIV; the corresponding metal complexes of structures III, IV, V, VI, VII, VIII, IX, X, XI, XII and XIII are, respectively, XV, XVI, XVII, XVIII, XIX, XX, XXI, XXII, XXIII, XXIV and XXV. The corresponding cobalt complexes of the ligands are given in formulas XXVI through XXXVII.

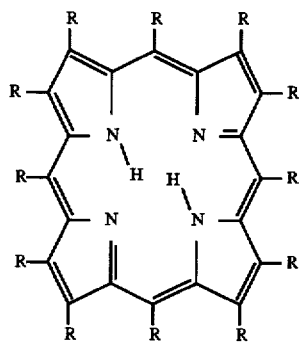

(II)

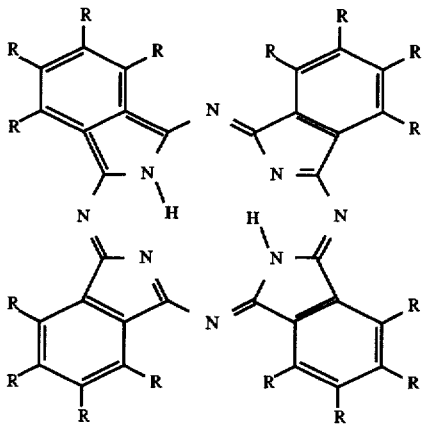

(III)

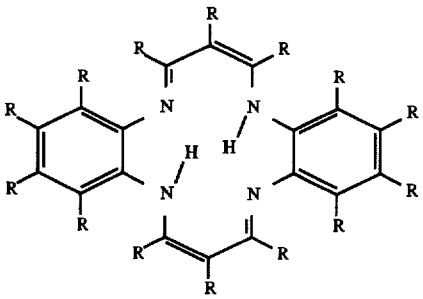

(IV)

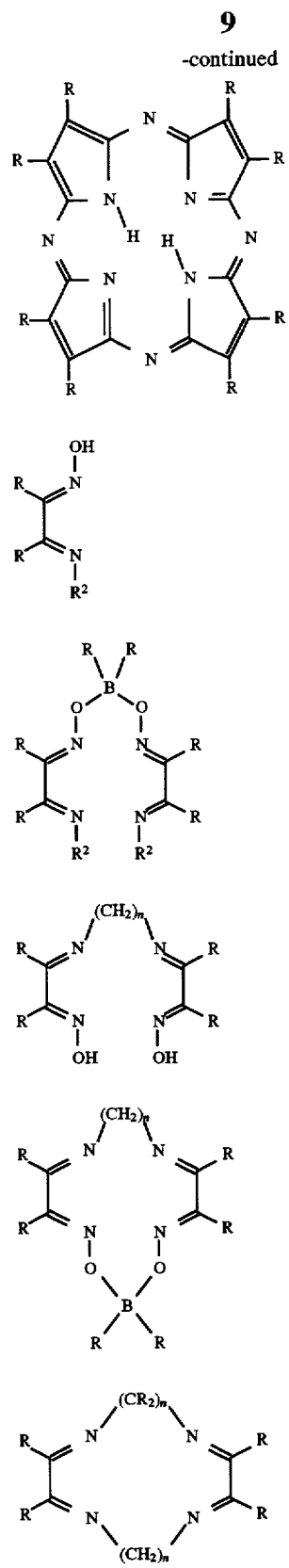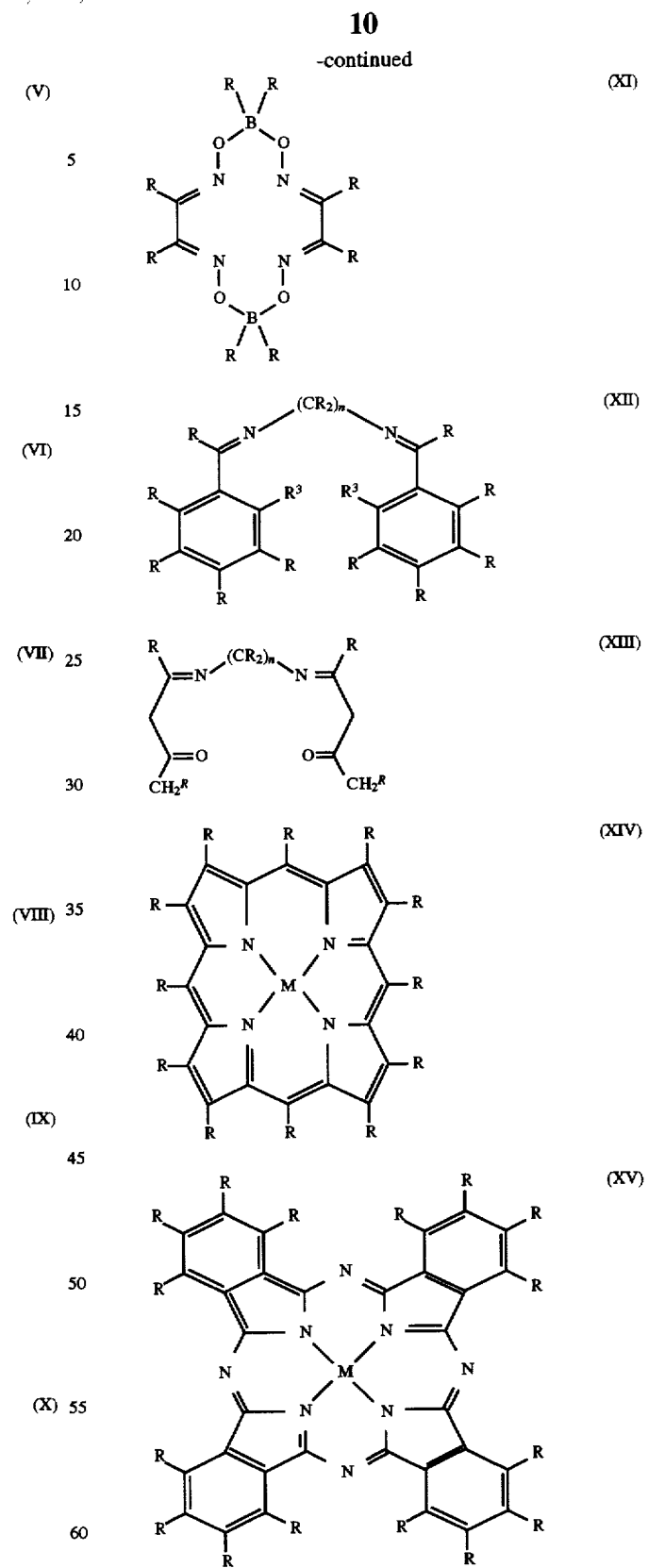

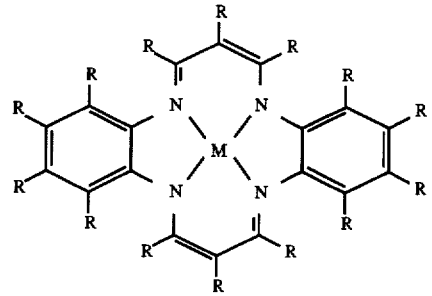
(XVI)
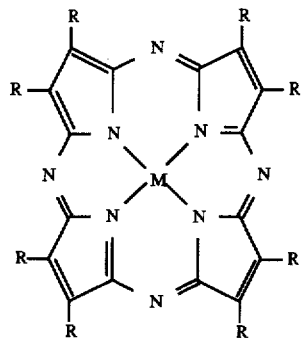
(XVII)
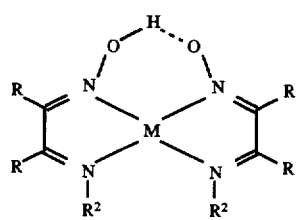
(XVIII)
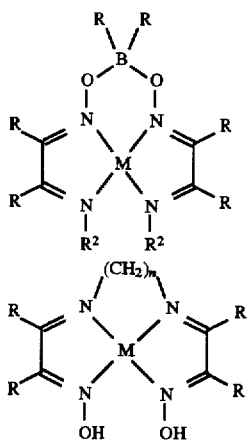
(XIX)
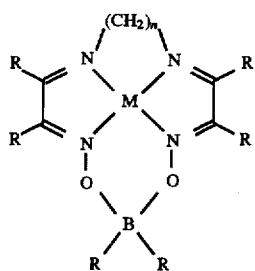
(XX)
(XXI)
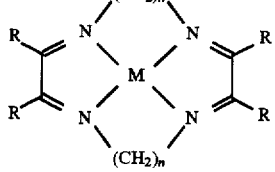
(XXII)
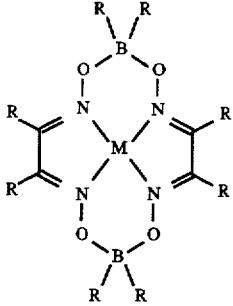
(XXIII)
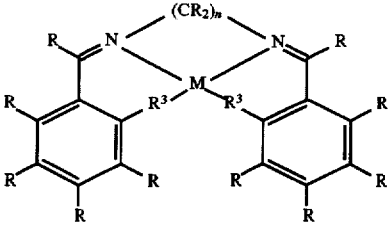
(XXIV)
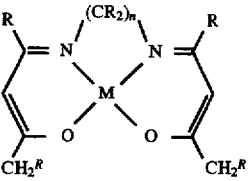
(XXV)
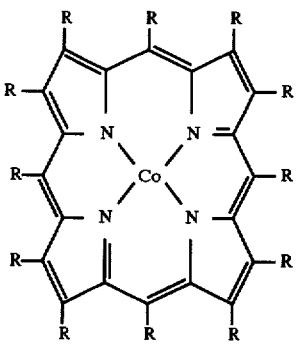
(XXVI)

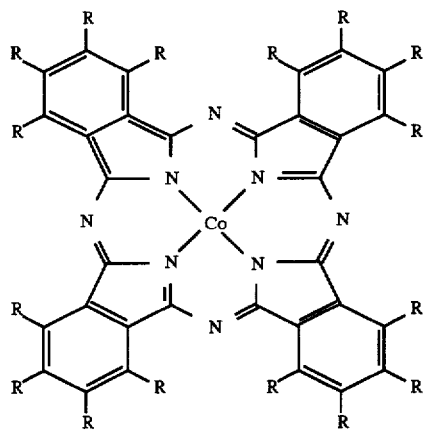
(XXVII)
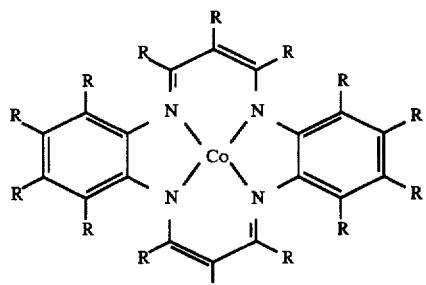
(XXVIII)
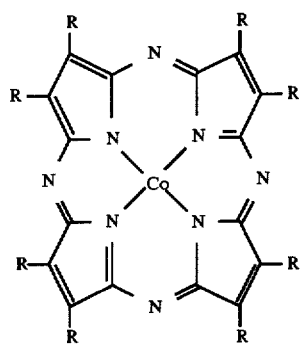
(XXIX)
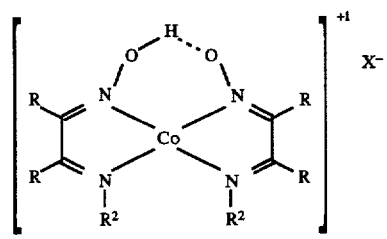
(XXX)
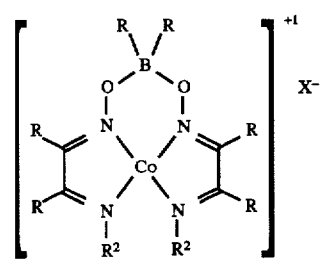
(XXXI)
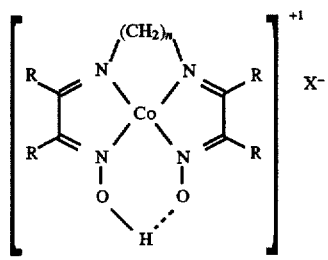
(XXXII)
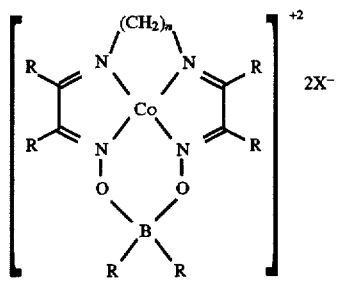
(XXXIII)
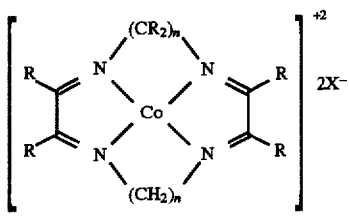
(XXXIV)
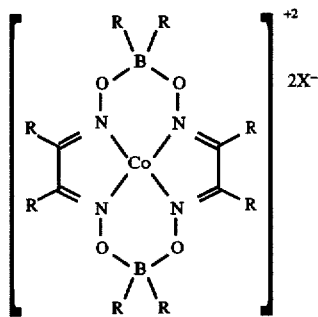
(XXXV)
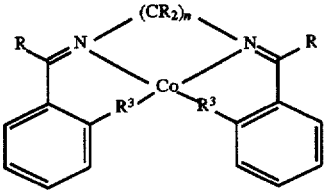
(XXXVI)
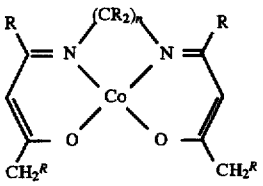
(XXXVII)

-continued

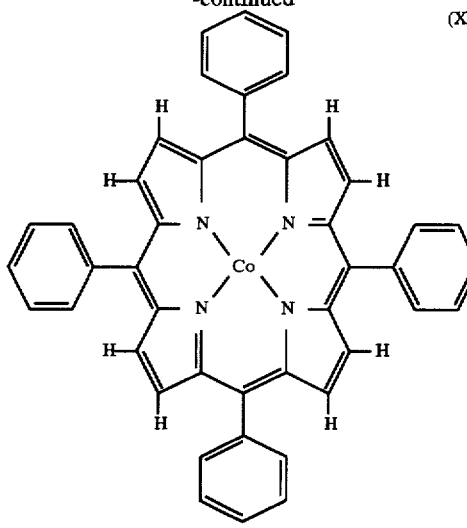

(XXXVIII)

In formulas XIV through XXXVII, R, $R^2$, $R^3$ and n are as defined above, each $R^6$ is either O or NH; and $X^-$ is $NO^-$, $Cl^-$, $I^-$, $BF4^-$, $SbF_6^-$ or $R^1COO^-$ — wherein $R^1$ is $C_1$ to $C_{12}$ alkyl. The cobalt chelates of the above formulas may also, but need not, be coordinated with additional ligands derived from materials present in the reaction medium.

References for the preparation of ligands with structures X–XIII can be found in the following patents: Janowicz, A. H. U.S. Pat. No. 5,028,677, 1991; Janowicz, A. H., Melby, L. R. U.S. Pat. No. 4,680,352, 1987; and Janowicz, A. H. U.S. Pat. No. 4,694,054, 1987.

The cobalt complexes of structures XXVI through XXXVI can be prepared by reacting the corresponding ligands, II through XIII, respectively, with $Co(II)X_2$. See, for example, the syntheses described in commonly assigned U.S. Pat. No. 4,680,352 to Janocwicz et al, which is hereby incorporated by reference in its entirety. The analogous cobalt(III) complexes (LCo—R) can be used in the process of this invention if they decompose quickly at polymerization temperatures by Co—R bond homolysis yielding an R. radical and the corresponding $LCo''$ radical capping agent. Examples of such ligands include —H, —F, —Cl, —Br, —I, —CN, straight or branched alkyl, or phenyl. The alkyl and phenyl groups can be unsubstituted or partially or fully substituted with substituents that are compatible with the use of these ligands as radical initiators.

References for the synthesis of LCo—R complexes are found in Ogoshi, H., Watanabe, E., Koketsu, N., Yoshida, Z. Bulletin of the Chemical Society of Japan, vol 49 (9), 2529–2536 (1976); Callot, H.-J., Metz, F., Cromer, R. Nouveau Journal De Chimie, vol 8, No. 12, 759 (1984); and Fauret-perree, M., Gaudemer, A., Bovely, P., Devynck, J. Journal of Organometallic Chemistry, 120, 439–451 (1976). Porphyrin Ligands and Metalioporphyrin complexes can also be purchased from: Aldrich Chemicals Co., 1001 W. Saint Paul, Avenue, Milwaukee, Wis. 53233 and Midcentury Chemicals, P.O. Box 217, Posen, Ill. 60469.

The preferred radical capping agents herein are (tetraphenylporphyrinato)cobalt(II) derivatives (XXXVIII above) that are partially or fully substituted on the phenyl rings. Examples of such substituents include —F, —Cl, —Br, —I, —CN, —$OR^7$, —$NR^7_2$, —$SO_3R^7$ and —$R^7$ wherein $R^7$ is a straight or branched alkyl group. These ligands are prepared by condensation of pyrrole with the corresponding substituted benzaldehyde in the presence of $BF_3$— etherate followed by oxidation with p-chloranil.

Regarding the synthesis of porphyrin ligands see Wagner, R. W., Lawrence, D. S., Lindsey, J. S. Tetrahedron Letters, 28, 3069 (1987). The cobalt(II) complexes are prepared by reacting the ligands with Co(II) salts, preferably cobalt(II) acetate. For the preparation of cobalt-porphyrins see: Rothemund, P., Memotti, A. R. J.A.C.S., 70, 1808 (1948) and Wayland, B. B., Minkiewicz, J. V., Abd-El-Mageed, M. E. J.A.C.S., 96, 2795 (1974). The preferred cobalt(III) derivatives (LCo—R) of XXXVIII contain a branched and unsubstituted or partially substituted alkyl group. These complexes can be prepared by the reduction of the appropriate cobalt(II) complexes (LCo) with sodium amalgam and subsequent reaction with the corresponding alkyl halide to form LCo—R.

The polymerization can be carried out either in the presence or absence of a polymerization medium. Suitable solvents as polymerization media are aromatic hydrocarbons, such as benzene, toluene, xylenes, pyridines or other solvents that have comparably small chain transfer constants with the particular monomer(s) used in the polymerization. The polymerization can be carried out at −80° C. to 80° C. The preferred reaction temperature range is 25° C.–70° C. Any of the known class of azo polymerization initiators is suitable provided it has requisite solubility in the solvent or monomer mixture chosen and has an appropriate half-life at the temperature of polymerization. Preferably, the initiator has a half-life that is short when compared to the total time required for the polymerization process. The process of the invention is carried out preferably as a batch process, but when needed can be carried out in any of the standard polymerization processes, for example semi-batch, starved feed, or continuous processes. The polymer is isolated by stripping off solvent and unreacted monomer and weighed to determine the conversion. The process of the invention is carried out most effectively with 1-substituted alkenes such as acrylic acid, its esters, amides and nitriles, styrene, etc. and their mixtures. To ensure maximum catalyst activity, the polymerization should be carried out in the substantial absence of oxygen under an inert atmosphere, such as nitrogen, argon or other non-oxidizing gas.

Preferred aspects of this invention include:

A. A process for the living free radical homopolymerization or copolymerization of ethylenically unsaturated monomers wherein the living polymerization is controlled by means of a reversible radical capping agent which is a metal complex.

B. The process of A characterized in that the metal complex functions as a capping agent and/or an initiator in the process, wherein said transition metal complex is in accordance with formula I below in which M is a transition metal ion which has two readily interconverted adjacent valence states, R is an inorganic or organic moiety bound by a labile bond to the transition metal, L is a planar equatorial or approximately planar arrangement of chelating ligands, and B is an axial ligand.

C. The process of B wherein L essentially or effectively sterically suppresses or eliminates termination of the growing polymer chain due to abstraction of hydrogen atom β to the carbon bearing the radical.

D. The process of A wherein the L is selected from porphyrins, phthalocyanines, tetraaza[14]-annulenes, tetraazaporphyrins, vicinal iminohydroxyimino compounds and their bridged derivatives, diazadihydroxyiminodialkyldecadienes and -undecadienes and their bridged derivatives, tetraazatetraalkyl-cyclotetradecatetraenes and -dodecatetraenes, N,N,-bis (salicylidene)ethylenediamines and dialkyldiazadioxo-dialkyldodecadienes and -tridecadienes.

E. The process of A wherein the substituents on L are phenyl or larger in terms of steric bulk.

F. The process of B wherein R is an organic moiety which is bound by a carbon-metal bond to the transition metal.

G. The process of A wherein the metal is a member of the first transition series comprising cobalt, iron, chromium and manganese.

H. The process of A wherein the metal is cobalt.

I. The process of A characterized in that the equatorial coordination is obtained from a single quadridentate chelating ligand, from two bidentate ligands, or from one bidentate ligand plus two monodentate ligands, or any other appropriate combination of ligands.

J. The process of A wherein R is an alkyl, aryl, heterocyclic species or a substituted derivative of one of these species which is capable of homolytic dissociation from the metal ion on heating or on irradiation with visible or ultraviolet light.

K. The process of A wherein the ratio of monomer to capping agent is from 5 to 1 to 10,000 to 1.

L. The process of A wherein the polydispersity of the product ranges from 1.0 to 1.5.

M. The process of B wherein the axial ligand B is water, an alcohol or other hydroxylic species, a thioether, amine, phosphine, carbonyl, or carboxylate compound.

N. The process of B wherein the ligand B is derived in situ from a monomer or other species present in the polymerization mixture.

O. The process of A wherein an organic or aqueous solvent provides a polymerization medium.

P. The process of A wherein the monomers comprises 1-substituted ethene.

Q. The process of P wherein the monomer is selected from the group consisting of acrylic acid, its esters and amides, substituted or unsubstituted styrene, or acrylonitrile or mixtures thereof.

R. The process according to A further comprising the sequential addition of a series of diverse monomers in order to prepare a block copolymer.

S. The process of A wherein all the monomers are the same.

T. The process of A wherein the polymer product has a molecular weight of 500 to 1,000,000.

U. A coating made with the polymer product of T.

V. The coating of U wherein the coating is an automotive finish.

W. The coating of U wherein said polymer has a polydispersity ranging from 1.0 to 1.5.

X. The coating of U wherein said polymer has a molecular weight of 50,000 to 500,000.

Y. A process for preparing a block copolymer comprising living free radical copolymerization of ethylenically unsaturated monomers wherein the living polymerization is controlled by means of a reversible radical capping agent which is a metal complex and wherein a series of diverse monomers are added in sequence during polymerization to form the block copolymer.

EXAMPLE 1

A. Preparation of (tetramesitylporphyrinato)cobalt-neopentyl, referred to as (TMP)Co—$CH_2C(CH_3)_3$.

In a reaction-vessel equipped with a vacuum adapted stop-cock was placed 100 mg (0.0001 mol) of (TMP)Co(II) and 2 g of (3% Na/Hg amalgam). Freshly distilled THF, in the amount of 100 ml, was added by vacuum distillation and the mixture allowed to stir for 16 hours under vacuum with the exclusion of light. After removal of the Na/Hg amalgam, the solvent THF was evacuated and 300 mg (0.002 mol) neopentyl bromide (($CH_3CCH_2Br$) was vacuum distilled into the reaction flock where immediate formation of (TMP)Co-neopentyl occurred. The product was collected in 96% yield (110 mg) inside an inert-atmosphere box after removal of the excess alkyl-halide by vacuum. Similar procedures were followed for the preparation of (tetraphenylporphyrinato)cobalt-neopentyl, (TPP)Co—$CH_2C(CH_3)_3$, and (TMP)Co—$CH(CO_2CH_3)CH_2CH_3$.

B. The use of (TMP)Co-neopentyl complex, (TMP)Co—$CH_2$—$C(CH_3)_3$, as a catalyst and reversible capping agent to initiate and control the living radical polymerization of methyl acrylate at 60° C.

A reaction vessel was charged with 7.0 g (0.081 mol) of commercial grade inhibitor free methyl acrylate and 20 ml reagent grade benzene and deoxygenated by stirring under nitrogen for one-half hour at room temperature. (TMP)Co-neopentyl, in the amount of 30 mg (0.000033 mol), was added and after complete dissolution the system was heated to 0° C. During polymerization aliquots were taken by syringe and the excess monomer and solvent were stripped out on a rotary evaporator and the polymer was weighed to determine the conversion. Table I shows the change in conversion and molecular weight with time.

TABLE I

| Time (hours) | Conversion % | $\bar{M}_n$ | $\bar{M}_w$ | $\bar{M}_w/\bar{M}_n$ | Peak MW |
|---|---|---|---|---|---|
| 0.5 | 5.5 | 7,856 | 8,650 | 1.101 | 8,500 |
| 1.5 | 11.5 | 18,930 | 21,990 | 1.161 | 21,200 |
| 5 | 20 | 38,120 | 45,970 | 1.205 | 44,000 |
| 15 | 42 | 91,930 | 108,900 | 1.174 | 105,100 |
| 38 | 66 | 143,600 | 173,500 | 1.207 | 169,800 |

A duplicate experiment carried out without (TMP)Co-neopentyl did not produce an observable amount of polymer in 24 hours.

EXAMPLE 2

This example illustrates the use of (TMP)Co—$CH(CO_2CH_3)CH_2CH_3$ to initiate and control the living radical polymerization of methyl acrylate.

Example I was repeated except that 31 mg (0.000033 mol) (TMP)Co—$CH(CO_2CH_3)CH_2CH_3$ was used as initiator and capping agent. Conversion and molecular weight data are summarized in Table II.

TABLE II

| Time (hours) | Conversion % | $\bar{M}_n$ | $\bar{M}_w$ | $\bar{M}_w/\bar{M}_n$ | Peak MW |
|---|---|---|---|---|---|
| .5 | 12 | 20,100 | 22,900 | 1.14 | 22,300 |
| 3 | 31 | 58,300 | 58,200 | 1.17 | 65,500 |
| 12 | 55 | 80,800 | 97,000 | 1.20 | 93,900 |

EXAMPLE 3

This example illustrates the decrease in livingness at higher reaction temperature due to termination by chain transfer processes.

Example I was repeated except that the reaction temperature was 80° C. The conversion and molecular weight data are summarized in Table III. A duplicate experiment carried out without (TMP)Co-neopentyl did not produce an observable amount of polymer in 7 hours.

TABLE III

| Time (hours) | Conversion % | $\bar{M}_n$ | $\bar{M}_w$ | $\bar{M}_w/\bar{M}_n$ | Peak MW |
| --- | --- | --- | --- | --- | --- |
| 0.5 | 20 | 26,000 | 33,000 | 1.28 | 31,200 |
| 2 | 30 | 42,000 | 66,100 | 1.56 | 59,400 |
| 7 | 53 | 81,780 | 179,900 | 2.20 | 151,000 |

EXAMPLE 4

This example illustrates the decrease in rate of polymerization livingness due to a decrease in the size of the equatorial ligands.

Example I was repeated except that 24.5 mg (0.000033 mol) (TPP)Co-neopentyl was used as initiator and capping agent at T=60° C. Conversion and molecular weight data are summarized in Table IV.

TABLE IV

| Time (hours) | Conversion % | $\bar{M}_n$ | $\bar{M}_w$ | $\bar{M}_w/\bar{M}_n$ | Peak MW |
| --- | --- | --- | --- | --- | --- |
| 4 | 5 | 6,953 | 7,671 | 1.103 | 7,400 |
| 24 | 14 | 19,710 | 32,770 | 1.662 | 30,100 |
| 48 | 17 | 17,400 | 32,970 | 1.894 | 30,200 |
| 120 | 25 | 18,180 | 33,890 | 1.864 | 30,800 |

EXAMPLE 5

This example illustrates the use of (TMP)Co(II) as a stable metalloradical reversible capping agent to control the living radical polymerization of methyl acrylate initiated by an azo initiator.

A reaction vessel was charged with 0.055 g (0.000065 mol) of (TMP)Co(II), 0.010 g (0.000032 mol) of 2,2'-azobis (4-methoxy-2,4-dimethylvalenonitrile), 14 g (0.16 mol) of commercial grade, inhibitor free methyl acrylate and 28 ml reagent grade benzene. The half-life of the azo initiator is 11 minutes at 60° C. The mixture was deoxygenated by stirring under nitrogen for one-half hour at room temperature and subsequently heated at 60° C. During polymerization aliquots were taken out by syringe and the excess monomer and solvent were stripped out on a rotary evaporator. Table V shows the change in conversion and molecular wieght with time.

TABLE V

| Time (hours) | Conversion % | $\bar{M}_n$ | $\bar{M}_w$ | $\bar{M}_w/\bar{M}_n$ | Peak MW |
| --- | --- | --- | --- | --- | --- |
| 1 | 3.0 | 5,9000 | 6,6000 | 1.12 | 6,400 |
| 2 | 20.9 | 40,300 | 47,100 | 1.17 | 45,500 |
| 4 | 39.8 | 76,500 | 92,600 | 1.21 | 89,900 |
| 6 | 49.5 | 99,000 | 120,700 | 1.21 | 116,800 |

A duplicate experiment carried out without (TMP)Co(II) radical produced poly(methyl acrylate) in 75% conversion in 90 minutes with very low solubility in THF probably because of very high molecular weight.

EXAMPLE 6

This example illustrates the use of (TMP)Co(II) as a stable metalloradical reversible capping agent in the synthesis of a block copolymer of methyl acrylate and butyl acrylate.

Polymerization of methyl acrylate was carried out similarly to that described in Example 5 except that 0.060 g (0.000072 mol) (TMP)Co(II) complex was used. After 6 hours of polymerization at 60° C. the polymer solution was cooled and the solvent and monomer were stripped out under vacuum. Commercial grade, inhibitor free butyl acrylate, in the amount of 15 g (0.11 mol), and 25 ml of reagent grade benzene, both previously deoxygenated, were added to the polymer sample. Polymerization continued for another 6 hours at 60° C. and then the monomer and solvent were stripped out under vacuum. The product of the first polymerization step was poly(methyl acrylate) in 28% conversion with the following characteristics: $\bar{M}_n$ 40,600, $\bar{M}_w$ 48,800, $\bar{M}_w/\bar{M}_n$ 1.20, Peak MW 47,400. The product of the second polymerization step was a poly(methyl acrylate)-poly(butyl acrylate) block copolymer with the following characteristics: $\bar{M}_n$ 131,400, $\bar{M}_w$ 172,500, $\bar{M}_w/\bar{M}_n$ 1.31, Peak MW 161,900.

EXAMPLE 7

This example illustrates the use of (TMP)Co(II) as a stable metalloradical reversible capping agent in the synthesis of a block copolymer of methyl acrylate and acrylic acid.

Polymerization of methyl acrylate was carried out similarly to that in Example 5 except that 0.065 g (0.000077 mol) of (TMP)Co(II) complex was used. After 6 hours of polymerization at 60° C. the polymer solution was cooled and the solvent and monomer were stripped out under vacuum. Commercial grade, inihibitor free acrylic acid, in the amount of 10 g (0.14 mol), and 25 ml benzene, both previously deoxygenated, were added to the polymer sample. Polymerization continued for an additional 6 hours at 60° C. and then the unreacted monomer and the solvent were stripped out under vacuum. The product of the first polymerization step was poly(methyl acrylate) in 21% conversion with the following characteristics: $\bar{M}_n$ 39,500, $\bar{M}_w$ 46,700, $\bar{M}_w/\bar{M}_n$ 1.19, Peak MW 44,900. The product of the second polymerization step was a poly(methyl acrylate)-poly(acrylic acid) block copolymer with the following characteristics: $\bar{M}_n$ 54,500, $\bar{M}_w$ 74,200, $\bar{M}_w/\bar{M}_n$ 1.36, Peak MW 70,700.

EXAMPLE 8

This example illustrates the increase in polymerization rate without loss of livingness due to increase in steric size of equatorial ligands of tetra(triethylphenyl)porphyrin Co(II) complex, (TTEPP)Co(II), as a stable metalloradical reversible capping agent in the living radical polymerization of methyl acrylate.

Example 5 was repeated except that 0.066 g (0.000065 mol) of (TTEPP)Co(II) was used as capping agent. Table VIII shows the change in conversion and molecular weight with time.

TABLE VIII

| Time (hours) | Conversion % | $\bar{M}_n$ | $\bar{M}_w$ | $\bar{M}_w/\bar{M}_n$ | Peak MW |
| --- | --- | --- | --- | --- | --- |
| 1 | 4.5 | 9,100 | 10,900 | 1.20 | 10,600 |
| 2 | 23.0 | 44,000 | 53,700 | 1.22 | 50,900 |
| 4 | 44.2 | 77,000 | 99,300 | 1.29 | 94,100 |
| 6 | 58.1 | 101,400 | 126,800 | 1.25 | 120,700 |

EXAMPLE 9

This example illustrates the use of tetra(o-dichlorophenyl) porphyrin Co(II), (Cl$_8$TPP)Co(II), as a stable metalloradical reversible capping agent in the living radical polymerization of butyl acrylate.

Example 5 was repeated except that 0.034 g (0.000036 mol) butyl acrylate as the monomer. Table IX shows the change in coversion and molecular weight with time.

TABLE IX

| Time (hours) | Conversion % | $\bar{M}_n$ | $\bar{M}_w$ | $\bar{M}_w/\bar{M}_n$ | Peak MW |
|---|---|---|---|---|---|
| 1 | 1.8 | 4,900 | 6,200 | 1.27 | 5,800 |
| 2 | 13.7 | 29,900 | 40,000 | 1.34 | 37,700 |
| 4 | 26.4 | 47,200 | 70,300 | 1.49 | 64,600 |

EXAMPLE 10

The example illustrates the use of (TMP)Co(II) as a stable metalloradical reversible capping agent in the living radical polymerization of pure methyl acrylate in the absence of solvent.

Example 5 was repeated except that the polymerization was carried out in the bulk—solvent was not added—and 01065 g (0.000077 mol) (TMP)Co(II) complex was used. Table X shows the change in conversion and molecular weight with time.

TABLE X

| Time (hours) | Conversion % | $\bar{M}_n$ | $\bar{M}_w$ | $\bar{M}_w/\bar{M}_n$ | Peak MW |
|---|---|---|---|---|---|
| 1 | 2.2 | 4,200 | 4,900 | 1.16 | 4,800 |
| 2 | 7.7 | 14,300 | 16,900 | 1.18 | 16,000 |
| 4 | 16.8 | 31,100 | 38,900 | 1.25 | 37,200 |
| 6 | 23.0 | 40,700 | 50,500 | 1.24 | 47,100 |

The best mode presently contemplated for carrying out the invention is represented by the disclosure and claims herein, it being understood that selection of the best mode will depend on a variety of factors, including the monomer (s) being polymerized, the polymer capping agent and the initiator employed, and the amounts thereof, and the polymerization conditions, such as temperature, pressure, conversion, and yield. In view of this disclosure, many modifications of this invention will be apparent to those skilled in the art. It is intended that all such modifications be included within the terms of the appended claims.

We claim:

1. A process for the quasi-living free-radical polymerization of an ethylenically unsaturated monomer comprising the steps:

(i) forming a transition metal initiator or initiator precursor having the formula:

L—M—(R)n wherein

L is a ligand having a molecular size equal to or greater than phenyl to sterically inhibit hydrogen atom abstraction from the growing polymer radical by L—M;

M is a transition metal selected from at least one of the elements Cr, Mn, Fe, Co, Ni and Cu;

L—M inhibits termination by reversibly capping the growing polymer chain;

R is an organic moiety that initiates polymerization selected from alkyl, aryl and heterocyclic species; and n is 0 or 1;

(ii) contacting the ethylenically unsaturated monomer with initiator, L—M—R, or with L—M plus a source of R. from a free-radical initiator external to L—M; and (iii) polymerizing the monomer by a free-radical mechanism, whereby a narrow polydispersity is maintained and the number average molecular weight of the polymer grows substantially linearly as monomer is converted to polymer.

2. A process according to claim 1 comprising contacting the monomer with transition metal initiator L—M—R.

3. A process according to claim 1 comprising contacting the monomer with L—M and an external source of R..

4. A process according to claim 1 wherein M is Co.

5. A process according to claim 1 wherein L is selected from the group porphyrins, phthalocyanines, tetraaza[14]-annulenes, tetraazaporphyrins, vicinal iminohydroxyimino compounds and their bridged derivatives, diazadihydroxy-iminodialkyldecadienes and -undecadienes and their bridged derivatives, tetraazatetraalkyl-cyclotetradecatetraenes and -dodecatetraenes, N,N,-bis(salicylidene) ethylenediamines and dialkyldiazadioxodialkyl-dodecadienes and -tridecadienes;

the bridged derivatives being formed from bridging ligand $BR_2$ wherein B is an axial ligand and R is independently selected from the group H, F, Cl, Br, I, CN, alkyl, aryl and aralkyl, or 2 R groups on adjacent carbon atoms, taken together, are $C_5$ to $C_8$ cycloalkylene.

6. A process according to claim 1 wherein R is an organic moiety bound to the transition metal by a carbon-to-carbon bond.

7. A process according to claim 1 wherein R is selected from the group alkyl, aryl, heterocyclic species and a substituted derivative of one of these species which dissociates from the metal ion on heating or on irradiation with visible or ultraviolet light.

8. A process according to claim 7 wherein R is alkyl.

9. A process according to claim 2 wherein L—M—R is (tetramesityylporphyrinato)cobalt-neopentyl.

10. A process according to claim 2 wherein L—M—R is (tetramesitylporphyrinato)cobalt-$CH(CO_2CH_3)CH_2CH_3$.

11. A process according to claim 3 wherein L—M is (tetramesitylporphyrinato)cobalt(II) and R. is derived from an azo initiator.

12. A process according to claim 11 wherein the azo initiator is 2,2'-azobis(4-methoxy-2,4-dimethylvaleronitrile).

13. A process according to claim 1 wherein the monomer comprises 1-substituted ethene.

14. A process according to claim 13 wherein the polymer is selected from the group consisting of acrylic acid, its esters and amides, substituted styrene, unsubstituted styrene, acrylonitrile and mixtures thereof.

15. A process according to claim 1 wherein the polymer is homopolymer.

16. A process according to claim 1 wherein the polymer is a random copolymer.

17. A process according to claim 16 wherein the copolymer comprises random components of at least one of the following units: acrylic acid, its esters and amides, substituted and unsubstituted styrene, acrylonitrile and mixtures thereof.

18. A process according to claim 1 comprising sequentially adding diverse monomers to form a block copolymer.

19. A process according to claim 1 wherein the polydispersity of the polymer does not exceed about 2.

20. A process according to claim 19 wherein the polydispersity of the polymer does not exceed 1.5.

* * * * *

UNITED STATES PATENT AND TRADEMARK OFFICE
CERTIFICATE OF CORRECTION

PATENT NO.   : 5,708,102

DATED        : JANUARY 13, 1998

INVENTOR(S)  : Michael Fryd, Bradford B. Wayland, George Poszmik and Shakti L. Mukerjee It is certified that error appears in the above-identified patent and that said Letters Patent is hereby corrected as shown below:

On the title page, item
"[73] Assignee: E. I. du Pont de Nemours and Company, Wilmington, Del"
should be -- [73] Assignee: E. I. du Pont de Nemours and Company, Wilmington, Del and The Trustees of the University of Pennsylvania, Philadelphia, PA --

Signed and Sealed this

Fourth Day of August, 1998

Attest:

BRUCE LEHMAN

*Attesting Officer*          *Commissioner of Patents and Trademarks*